(12) United States Patent
Triebel

(10) Patent No.: US 6,302,229 B1
(45) Date of Patent: Oct. 16, 2001

(54) AIR CUSHION TRANSPORT VEHICLE AND METHOD FOR CONTROLLING SAME

(76) Inventor: George Triebel, Zeithstrasse 70, D-53819 Neunkirchen-Seelscheid (DE)

( * ) Notice: Subject to any disclaimer, the term of this patent is extended or adjusted under 35 U.S.C. 154(b) by 0 days.

(21) Appl. No.: 09/418,615

(22) Filed: Oct. 15, 1999

(30) Foreign Application Priority Data

Oct. 16, 1998 (DE) ................................ 198 47 729

(51) Int. Cl.$^7$ .................................................. B64C 29/00
(52) U.S. Cl. .......................... 180/117; 180/126; 244/23 C
(58) Field of Search ........................... 180/116, 117, 180/120, 126; 244/17.23, 23 C, 23 R

(56) References Cited

U.S. PATENT DOCUMENTS

| | | |
|---|---|---|
| 2,953,320 * | 9/1960 | Parry . |
| 2,953,321 * | 9/1960 | Robertson et al. . |
| 2,997,254 * | 8/1961 | Mulgrave et al. . |
| 3,677,503 * | 7/1972 | Freeman, Jr. ........................ 244/23 C |
| 4,589,611 * | 5/1986 | Ramme et al. ........................... 244/6 |
| 5,150,857 * | 9/1992 | Moffitt et al. ......................... 244/12.2 |
| 5,351,913 * | 10/1994 | Cycon et al. ............................ 244/60 |

FOREIGN PATENT DOCUMENTS 28 00 975  7/1979 (DE) .
37 34 811  6/1988 (DE) .

* cited by examiner

*Primary Examiner*—Kevin Hurley
(74) *Attorney, Agent, or Firm*—Collard & Roe, P.C.

(57) ABSTRACT

The invention concerns a transport vehicle, comprised of a transport unit and a propulsion unit. The propulsion unit comprises a pressure housing with a plurality of radial turbine wheels arranged on a common shaft and rotating in opposite directions from one another. There are fixedly arranged combustion chambers having nozzles at the radially outwardly positioned ends of the turbine wheels. The invention also concerns a method of operating the transport vehicle.

14 Claims, 7 Drawing Sheets

AIR CUSHION TRANSPORT VEHICLE AND METHOD FOR CONTROLLING SAME

BACKGROUND OF THE INVENTION

1. Field of the Invention

The invention concerns a transport vehicle comprised of a transport unit and a drive propulsion unit. Transport vehicles include land vehicles, aircraft vehicles, as well as so-called space vehicles. Thus, the invention comprises a universally usable transport means that can be operated with slight modifications in gaseous media, but also in outer space.

2. The Prior Art

Known transport vehicles are specially adapted for a specific purpose, i.e., they are not usable in a universal manner. The use of turbines in aircraft is associated with high noise development and high usage of fuel.

Furthermore, complicated control mechanisms are required to maintain the flight condition both within and outside the atmosphere. In addition, many requirements have to be met in order to maintain the positional stability of a transport vehicle under the respectively prevailing surrounding influences such as wind and weather.

DE-OS 28 00 975 discloses a rotation dynamic flight implement aircraft in the shape of a circular disc. A carrier body is shaped as a circular ring that rotates about a vertical axis. There are exit openings arranged at the periphery of the carrier body to accommodate the means for providing thrust forces or power units. The principle of flight corresponds to that of a discus or a boomerang, in that changes of direction are possible by adjusting the nozzles.

This requires complicated control mechanisms for varying the flight condition both within and outside of the atmosphere. DE-OS 37 34 811 proposes the use of a rotating spinning top gyro to stabilize a flight-worthy carrier disc in horizontal manner such that the carrier surfaces are suspended floating on an air cushion without downward lateral tipping. Various flight movements are thereby made possible so that the spinning top has adjustable turbine blades at the outer edge. The blades act as a controllable air compressor. The self-rotation of the flight cell secured at the spinning top is prevented in that designated air expulsion nozzles act in an opposite direction to the self-rotation movement. Costly control devices are required to maintain stability of the vehicle, and consideration must be given to the respective atmospheric conditions.

SUMMARY OF THE INVENTION

It is therefore an object of the present invention to develop a universally utilizable transport vehicle that has a simple structure and exhibits a high positional stability in surrounding conditions.

It is another object of the invention to provide a transport vehicle that can be operated in an environmentally friendly and energy conserving manner.

These and other objects are achieved by a transport vehicle according to the invention comprising a propulsion unit and a carrier unit. The propulsion unit of the transport vehicle according to the present invention comprises turbine wheels that rotate in opposite directions with respect to one another. The outer circumferential ends of the turbine wheels have combustion chambers that are supplied by fixedly installed conduits extending from the center of the turbine with the drive media. The chambers have tangentially arranged exhaust nozzles.

The large dimensioned diameter of the turbine wheels creates a large centrifugal force that provides a high delivery pressure in the conduits. Air is forced radially outwardly via special air channels and is introduced into the combustion chambers. These air streams in the manner of the fan-principle can be used to cool the hot combustion gases.

The turbine wheels are arranged around a common hollow shaft which has openings for conducting air to the combustion chambers. There are comprising tank containers arranged in the turbine wheels to supply the combustion chambers with fuel.

There are preferably a plurality of slides or laterally arranged hatches in the bottom of the pressure housing for emitting exiting combustion gases from the nozzles. The slides or hatches control the gas-throughput cross-section and the gas discharge angle. The slide for the exit gases is formed by shifting two concentrically arranged segments of said pressure housing.

There is preferably at least one balancing mechanism arranged between the turbine wheels. There are also pivotally mounted feet arranged on the sides or bottom of the pressure housing. The feet can be rotated upward during movement of the vehicle.

In a preferred embodiment, the turbine wheels comprise a plurality of turbine blades arranged like spokes with air channels. The air channels continuously increase in a radial direction from interior to exterior.

There is preferably at least one oxidator and fuel tank arranged in each of the turbine wheels.

The bottom of the transport vehicle has a planar or concave cross-section.

The invention also comprises a method for controlling the above-described vehicle, comprising the steps of;

introducing a fuel mixture into the combustion chambers;

aspirating surrounding air via the hollow shaft and the radial air channels into the combustion chambers, igniting the resulting fuel-air mixture in the combustion chambers; and bringing each turbine wheel into an oppositely directed movement versus another turbine wheel, so that at increasing revolutions of the turbine wheels, additional surrounding air is pressed into the combustion chambers and fuel is simultaneously injected into the combustion chambers until sufficient inner pressure in the pressure housing is attained to accomplish horizontal or vertical transport movement.

The combustion gases collected in the pressure housing are used to control movement in three coordinate axes. Closing and opening the laterally arranged hatches in the pressure housing controls the direction of movement of the transport vehicle in horizontal direction because gases exiting from an open hatch produce an oppositely acting propulsion direction.

In the same way, opening and closing slides on the bottom of the pressure housing controls the vertical movement of the transport vehicle, because gases exiting from the slide cause an oppositely directed lift force.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
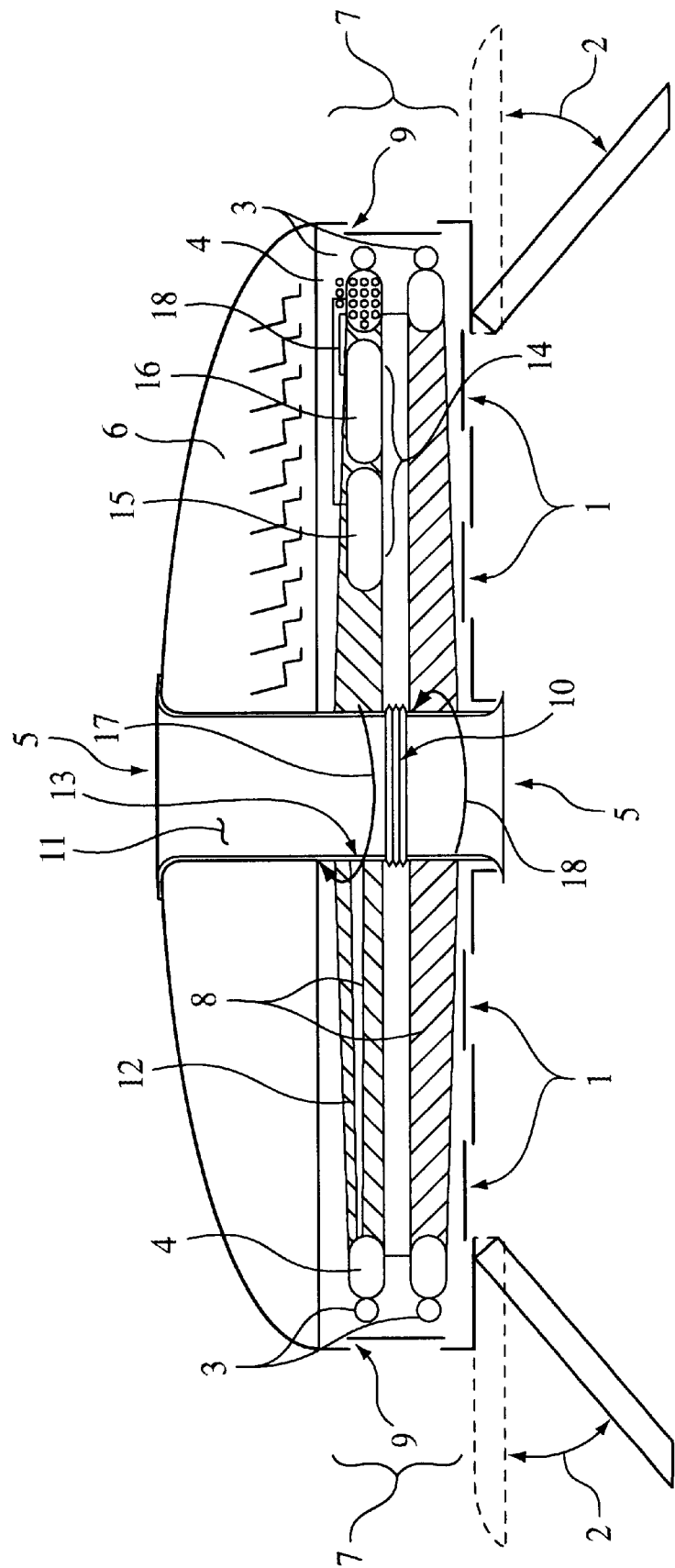
FIG. 1 is a cross-section through a transport vehicle according to the invention.

Referring now in detail to the drawings, FIG. 1 shows the core region of the new transport vehicle comprised of a pressure housing 7. Two turbine wheels 8 are arranged in pressure housing 7 to rotate in opposite directions with respect to one another about a common shaft 11. The two turbine wheels 8 are shown in cross-hatching in FIG. 1, and the direction of rotation is indicated by the two arrows 17, 18.

At the radially exterior ends of the turbine wheels 8 are fixedly secured exhaust nozzles 3 and combustion chambers 4, which emit hot combustion gases into the interior of the pressure housing 7 to produce a recoil effect.

Air required for combustion can either be supplied via aspiration through hollow shaft 11 and air channels 12, or, due to the centrifugal effect, forced via an oxidator tank 15 into the combustion chamber 4. Next to the oxidator tank 15 is also a fuel tank 16. Communication to the combustion chamber 4 occurs via schematically shown conduits 18.

The oppositely rotating turbine wheels 8 conform with the spinning top principle, and help to achieve position stability independent of the medium surrounding the transport vehicle. In the embodiment in which the vehicle is a ground vehicle, there are feet 2 arranged on the underside of pressure housing 7. Feet 2 can be raised and lowered as shown by the dotted lines. Above pressure housing 7, there is schematically shown a passenger compartment 6, which could also be utilized for other purposes such as a multiple-function transport unit for cargo, a signal emitting and receiving station, or for the intake of weapons.

Figure 2:
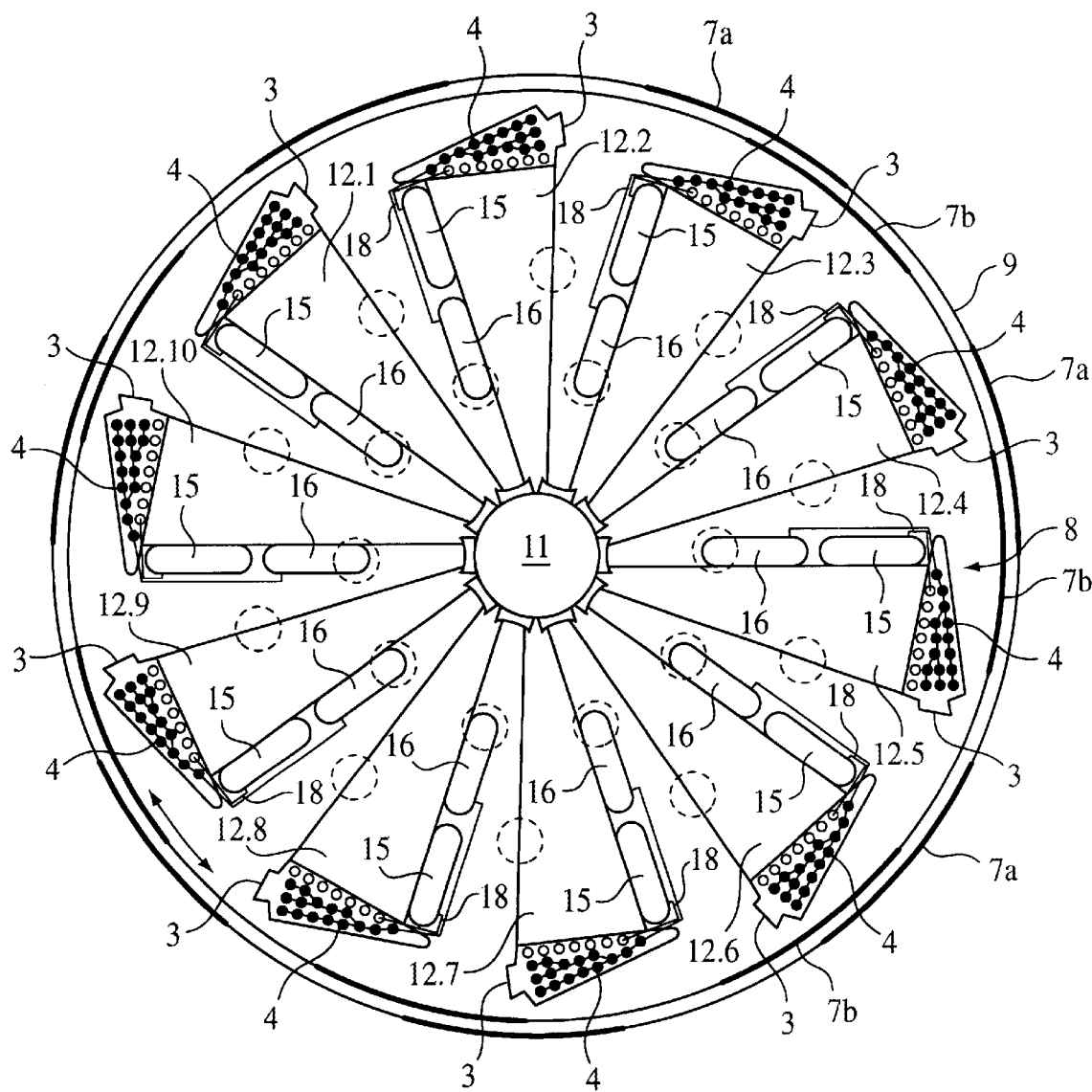
FIG. 2 is a plan view of a transport vehicle according to the invention.
Figure 3:
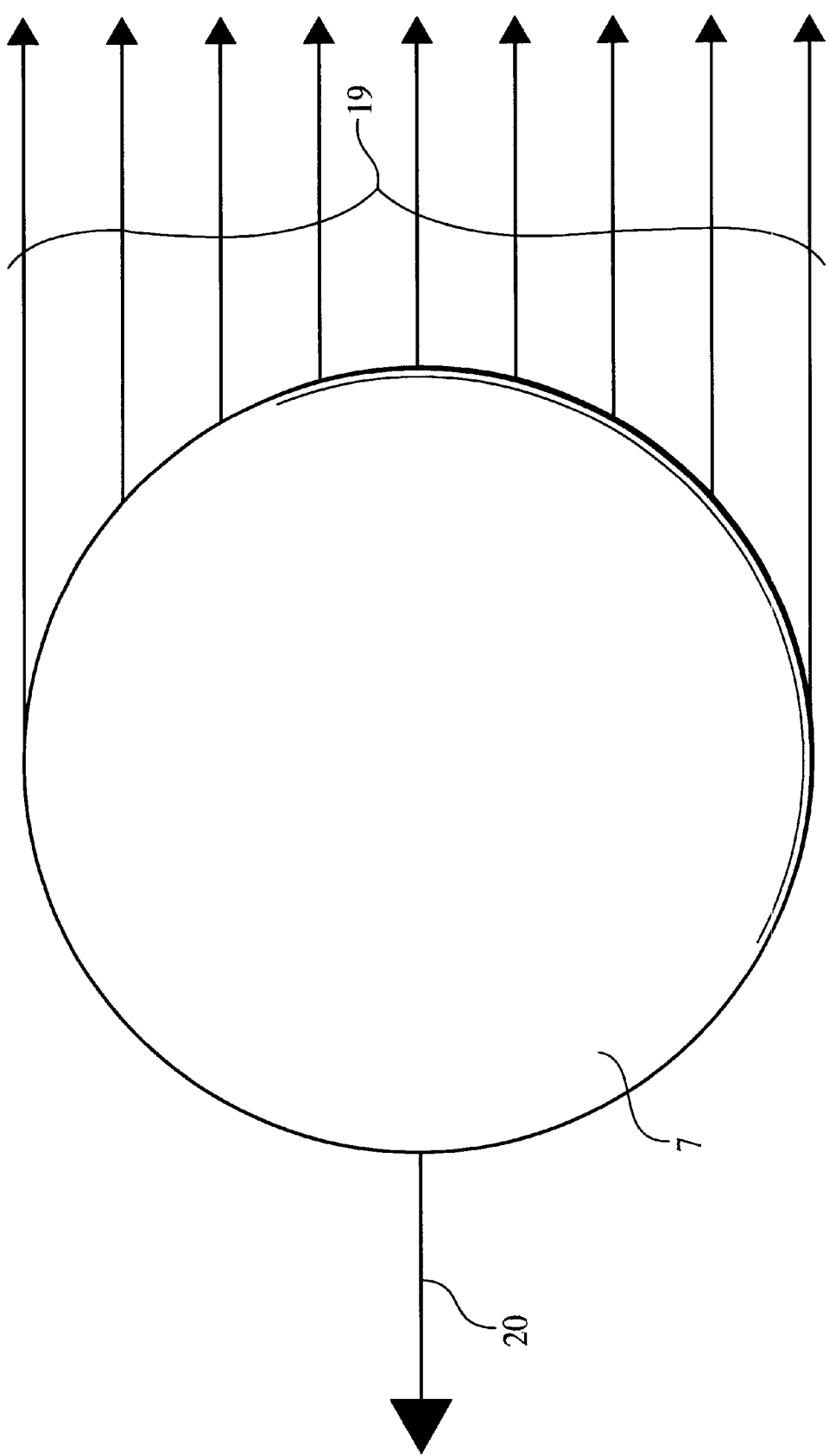
FIG. 3 is a schematic view of the movement in the horizontal direction.

FIG. 2 shows a horizontal section through the transport vehicle according to the invention. Turbine wheel 8 is comprised of a plurality of spoke-like arranged turbine blades 12.1–12.10, which are rotatably journalled on the hollow shaft 11. The schematic view of FIG. 2 shows that the cross-section of the turbine blades 12.1–12.10, when considered in radial direction from the interior to the exterior, continuously increases.

The conduits 18 communicate the oxidator tank 15 and the fuel tank 16 with the combustion chamber 4. Following ignition of the combustion gases, the gases are ejected by the exhaust nozzles 3 in tangential direction from the combustion chamber 4, so that according to the recoil principle, the turbine wheels 8 rotate in opposite directions. The turbine wheels positioned above and below are moving respectively in opposite directions, so that the recoil forces cancel each other out (resulting in force-0).

The guidance behavior of the transport vehicle according to the invention can be more explained with reference to FIGS. 3–6. The arrows 19 indicate the direction of the exit gases, while arrow 20 represents the resulting direction of propulsion.

To control the exit gases 19, the hatches 9 are opened, and, respectively, closed, as shown in FIGS. 1 and 2. The outer and inner housing segments 7a, 7b, shown schematically in FIG. 2, are moved towards one another, so that an exit opening for combustion gases stored in the pressure housing 7 is produced. Via corresponding control systems(not shown), the openings presented by the hatches 9 can be so precisely controlled that guidance movements in the horizontal direction are possible.

Figure 4:
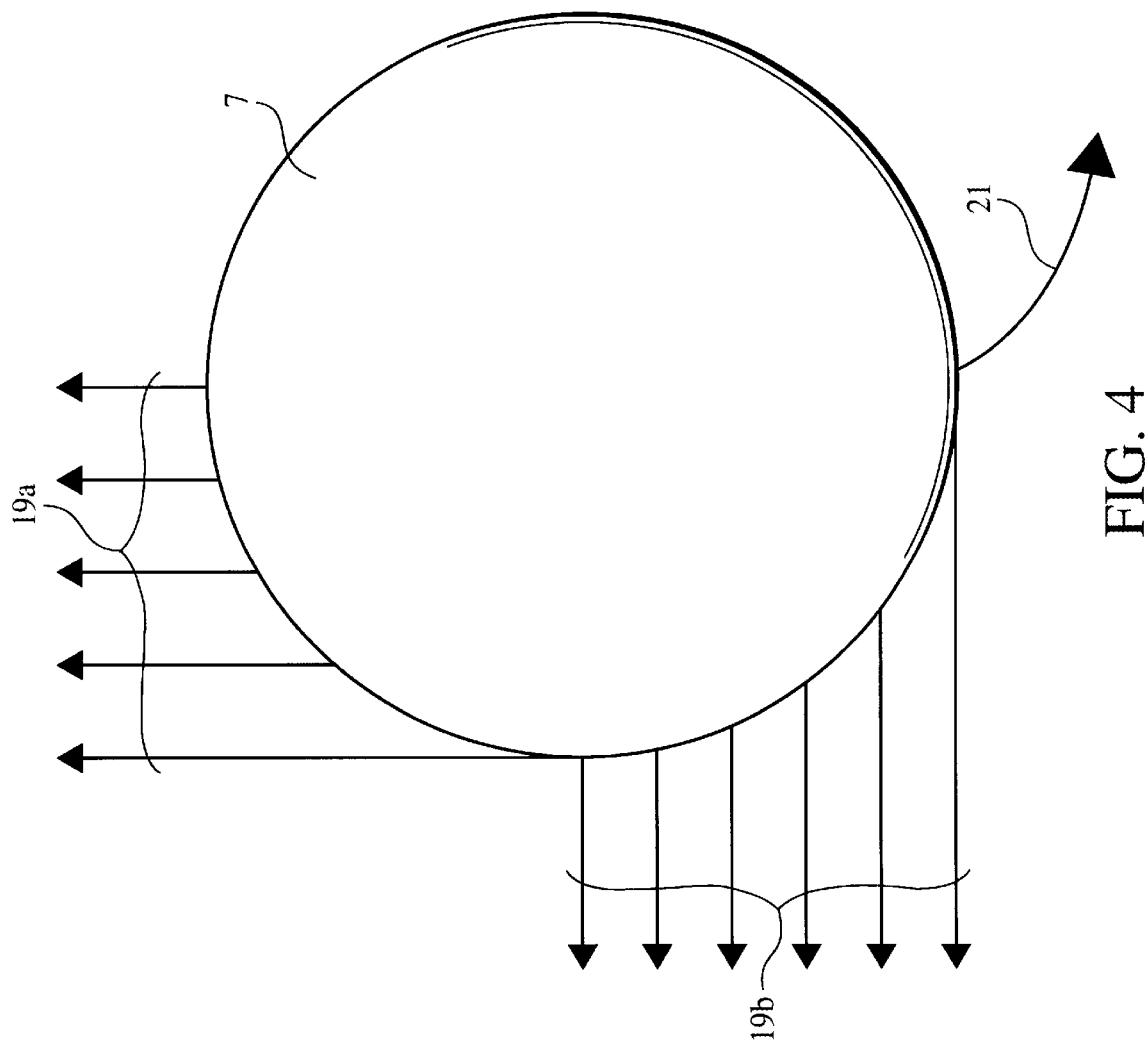
FIG. 4 is a schematic view of the guidance movement in the horizontal direction.

The hatches 9 are adjusted so that the exit gases 19a, 19b exit as components superimposed at right angles to one another with differing volume streams, shown in FIG. 4 by the number of arrows, from the pressure housing 7, resulting in a curving movement in the direction of the bent arrow 21.

Figure 5:
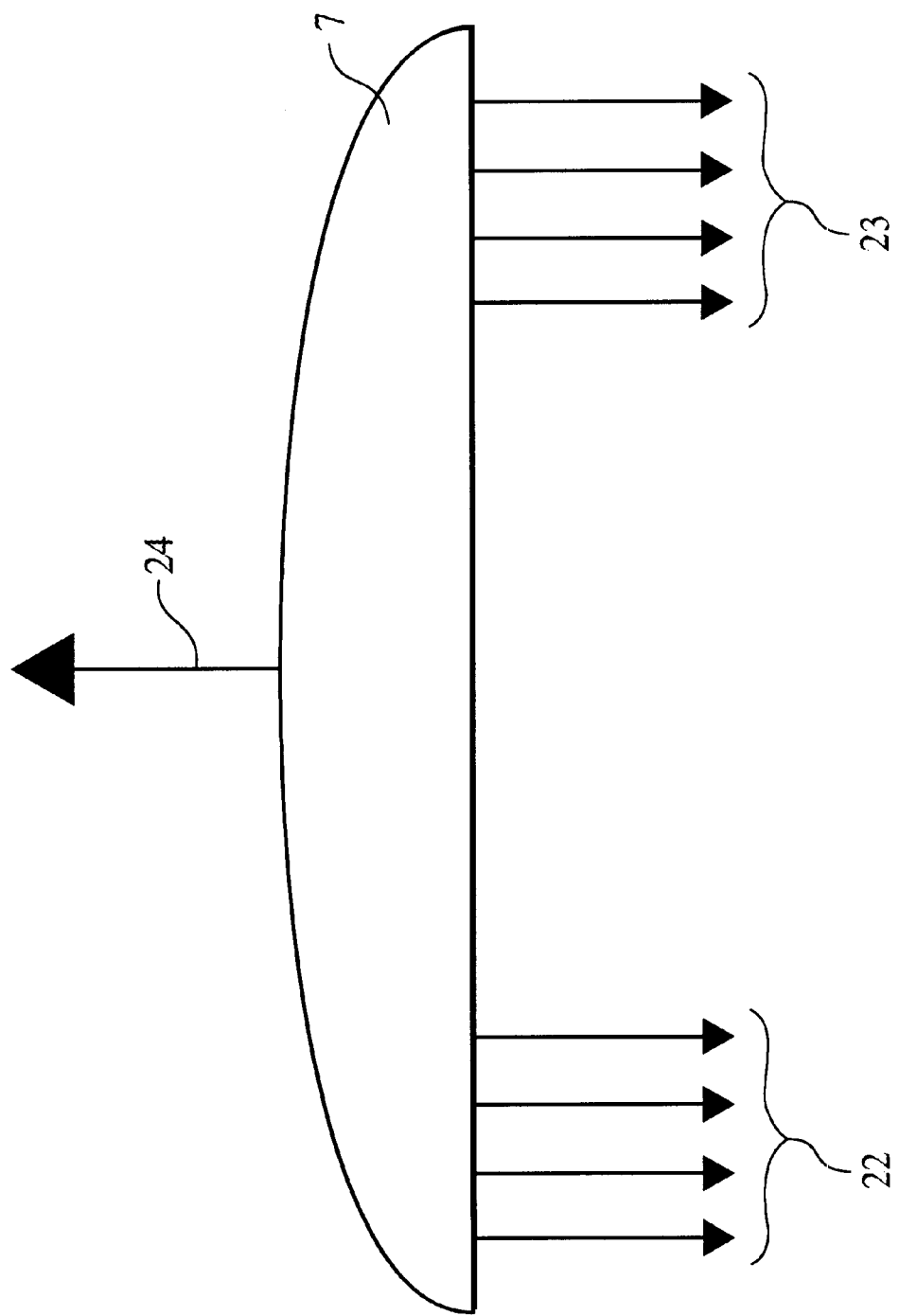
FIG. 5 is a schematic view of the movement in the vertical direction.

To move the transport vehicle according to the invention in a vertical direction, exit gases 22 and 23 are blown out from the pressure housing 7 in a downward direction, as shown in FIG. 5. This results in a lift force 24 that raises the transport vehicle from the ground. Angles of inclination for the lift force or, respectively, for the pressure housing 7 can be adopted by varying either the position of the exit gases 22 in relation to the outer edge of the pressure housing 7, or the volume of the exit gases.

Figure 6:
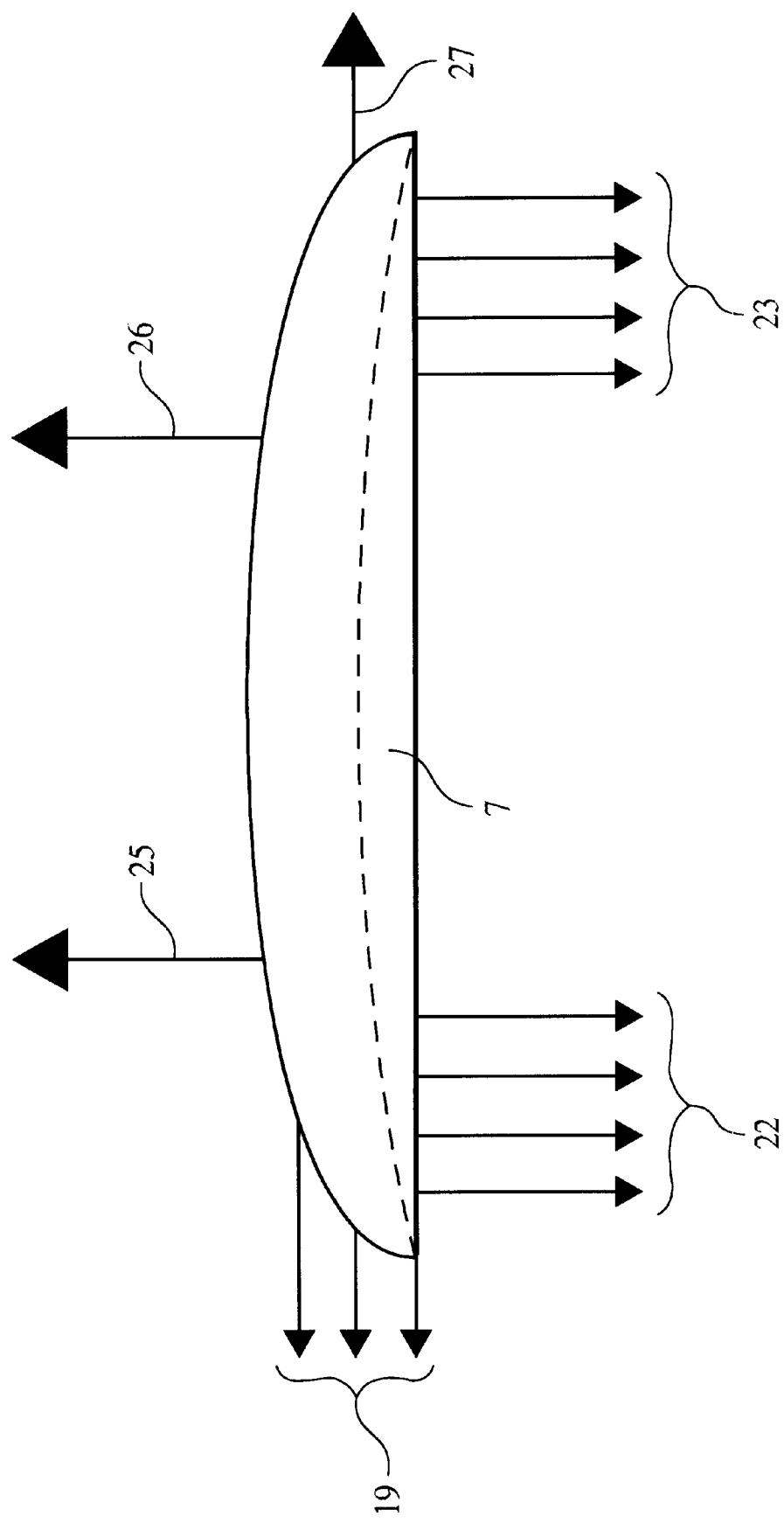
FIG. 6 is a schematic view of the composite movement in horizontal and vertical directions.

As shown in FIG. 6, combined vertical and horizontal movements can be carried out, by simultaneously blowing out exit gases 19, 22 and 23 from several sides or the bottom surface of the pressure housing 7. The direction of movement of the pressure housing 7 is indicated by the arrows 25, 26, and 27. In the event of a sufficiently large horizontal velocity, the hemispherical shape of pressure housing 7 produces a lift force 24 similar to that of an aircraft, so that the energy of the vertical exhaust gases can also be used for horizontal propulsion.

For aerodynamic horizontal movement, the bottom of pressure housing 7 is planar, or preferably rounded inwardly. The half-round concave bottom is shown by dashed lines in FIG. 6 and effects an additional lift at high horizontal velocity similar to an aircraft carrying-profile.

Turbine wheels 8, in the case of strict lift and descent flight, do not exhibit gap-losses when the pressure chamber 7 is fully closed. The radial turbine, comprised of turbine wheels 8 and combustion chambers 4, are always fixedly connected to one another. The large diameter of the turbine wheels 8 creates a high pressure through the arising centrifugal forces in combustion chambers 4. Air that is aspirated through the air channels 12 is forced radially in an outward direction and thus cools combustion chambers 4.

In accordance with a preferred embodiment, a combustion chamber 4 is not arranged at each end of a turbine blade 12.1–12.10. Air is transported through air channels 12 in the turbine blades into the pressure housing 7. Via suitable configuration of the exit nozzles, a by-pass effect can be created which, causes an additional energy supplement for the lift or advance of the transport vehicle according to the invention.

It is also possible to combine smaller units of the transport vehicle to form a large transport unit. In this case, the usable space between the drive units can be configured as desired, which increases the options of utilization of the present invention.

Figure 7:
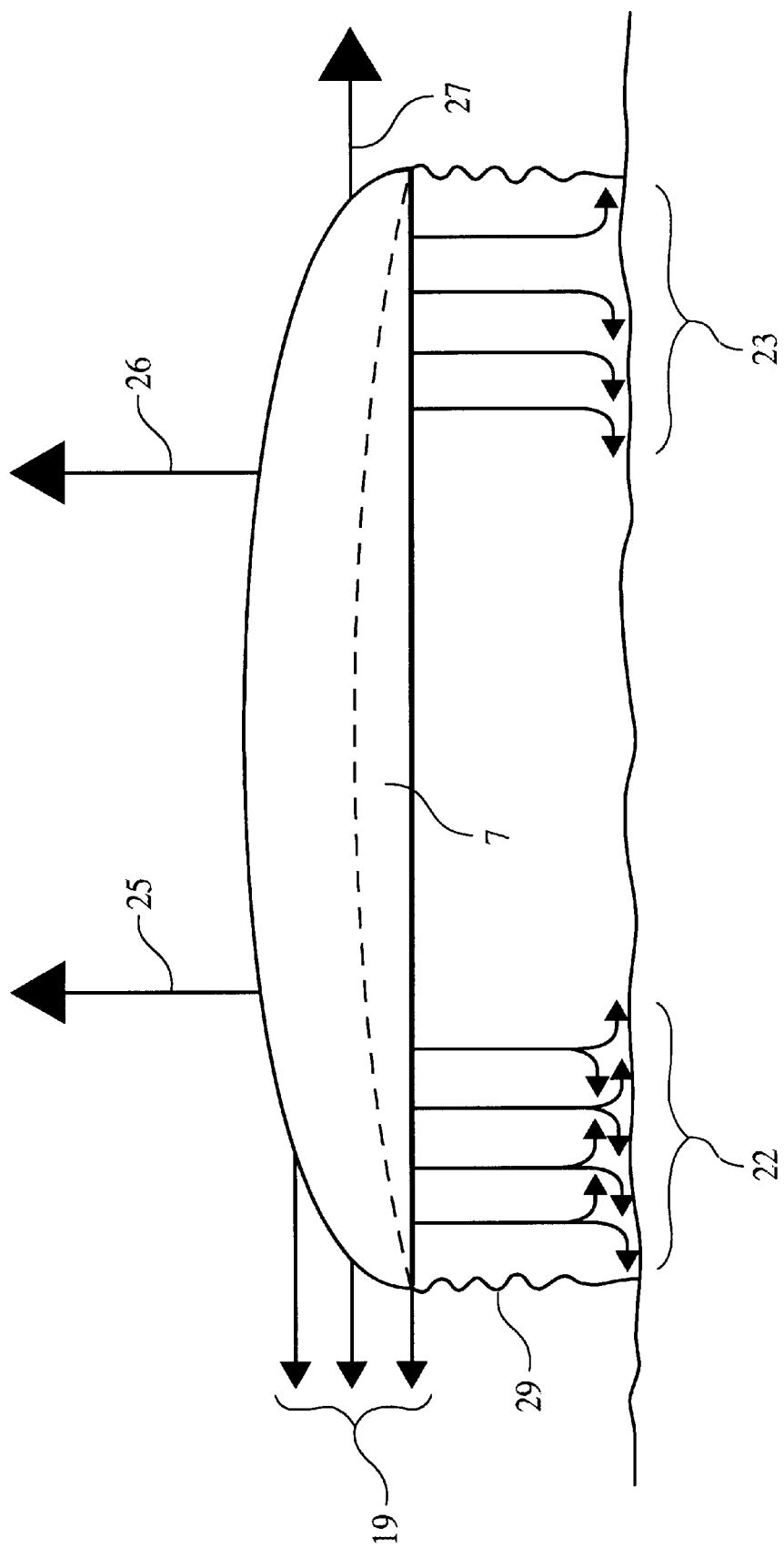
FIG. 7 is a schematic view of the combined movement in horizontal and vertical directions of an air or gas cushion vehicle.

In an alternative embodiment of the transport vehicle according to the invention, the lift, especially during the start phase, can be increased by providing an apron 29 extending around the edge of the bottom of pressure housing 7. As shown in FIG. 7, the apron 29 assures an increased ground pressure of the exit gases 22 and 23, so that an increased vertical component of the force of reaction arises in the direction of arrows 25 and 26.

Thus, air cushion vehicles can be utilized in a corresponding manner during operation of the transport vehicle in accordance with the invention within other media, such as, for example, gases or liquids. For example, a gas cushion vehicle can be achieved by using centrally located gas containers 14 arranged preferably at the spokes of the turbine wheels instead of centrally aspirated air. The gases required for combustion could be formed as reaction gases shortly prior to the actual combustion process.

In a chosen mode of operation at large heights with high horizontal velocity, or with relatively low horizontal velocity near the ground, the underside of the transport vehicle in accordance with the invention can be shaped to be either planar or, when viewed in cross-section, concave. This will allow utilization of aerodynamic effects, which are known in other transport vehicles such as a ship, aircraft, or passenger car.

Accordingly, while only a few embodiments of the present invention have been shown and described, it is obvious that many changes and modifications may be made thereunto without departing from the spirit and scope of the invention.

What is claimed is:

1. A transport vehicle comprising:
   a transport unit; and
   a drive unit connected to the transport unit and comprising:
   (a) a pressure housing having a bottom;
   (b) a plurality of radial turbine wheels arranged on a common shaft and rotating in opposite directions with respect to one another, said turbine wheels having radially exterior ends and being arranged within the pressure housing, and said turbine wheels having radial air channels formed therein; and
   (c) a plurality of fixedly secured combustion chambers having exhaust nozzles arranged at the radially exterior ends of each of said turbine wheels.

2. A transport vehicle according to claim 1, wherein the shaft is hollow and has openings for conducting air to the combustion chambers.

3. A transport vehicle according claim 1, further comprising tank containers arranged in the turbine wheels to supply the combustion chambers with fuel.

4. A transport vehicle according to claim 1, further comprising pivotally mounted feet arranged on one of the sides and bottom of the pressure housing.

5. A transport vehicle according to claim 1, further comprising:
   a transport unit; and
   a drive unit connected to the transport unit and comprising:
   (a) a pressure housing having a bottom;
   (b) a plurality of radial turbine wheels arranged on a common shaft and rotating in opposite directions with respect to one another, said turbine wheels having radially exterior ends and being arranged within the pressure housing;
   (c) a plurality of fixedly secured combustion chambers having exhaust nozzles arranged at the radially exterior ends of each of said turbine wheels; and
   (d) at least one of an oxidator and fuel tank arranged in each of said turbine wheels.

6. A transport vehicle according to claim 1, wherein the bottom of the transport vehicle has cross-section in a shape selected from the group consisting of planar and concave.

7. A transport vehicle comprising:
   a transport unit; and
   a drive unit connected to the transport unit and comprising:
   (a) a pressure housing having a bottom;
   (b) a plurality of radial turbine wheels arranged on a common shaft and rotating in opposite directions with respect to one another, said turbine wheels having radially exterior ends and being arranged within the pressure housing; and
   (c) a plurality of fixedly secured combustion chambers having exhaust nozzles arranged at the radially exterior ends of each of said turbine wheels, said exhaust nozzle have openings tangentially arranged around said turbine wheels.

8. A transport vehicle comprising:
   a transport unit; and
   a drive unit connected to the transport unit and comprising:
   (a) a pressure housing having a bottom;
   (b) a plurality of radial turbine wheels arranged on a common shaft and rotating in opposite directions with respect to one another, said turbine wheels having radially exterior ends and being arranged within the pressure housing;
   (c) a plurality of fixedly secured combustion chambers having exhaust nozzles arranged at the radially exterior ends of each of said turbine wheels; and
   (d) a plurality of apertures selected from the group consisting of slides and lateral hatches arranged in the bottom of the pressure housing for emitting exiting combustion gases from the nozzles, wherein said apertures control gas-throughput cross-section and gas discharge angle.

9. A transport vehicle according to claim 8, wherein said aperture for the exit gases is formed by shifting two concentrically arranged segments of said pressure housing.

10. A transport vehicle comprising:
    a transport unit; and
    a drive unit connected to the transport unit and comprising:
    (a) a pressure housing having a bottom;
    (b) a plurality of radial turbine wheels arranged on a common shaft and rotating in opposite directions with respect to one another, said turbine wheels having radially exterior ends and being arranged within the pressure housing, wherein said turbine wheels comprise a plurality of turbine blade arranged like spokes and having air channels, wherein the cross-sections of said blades continuously increase in a radial direction from interior to exterior; and
    (c) a plurality of fixedly secured combustion chambers having exhaust nozzles arranged at the radially exterior ends of each of said turbine wheels.

11. A method for control of a transport vehicle having a plurality of turbine wheels arranged around a hollow shaft in a pressure housing, a plurality of combustion chambers arranged radially around each turbine wheel and a plurality of radial air channels in each turbine wheel, comprising:
    introducing a fuel mixture into the combustion chambers;
    aspirating surrounding air via the hollow shaft and the radial air channels into the combustion chambers, igniting the resulting fuel-air mixture in the combustion chambers; and bringing each turbine wheel into an oppositely directed movement versus another turbine wheel, so that at increasing revolution of the turbine wheels, additional surrounding air is pressed into the combustion chambers and fuel is simultaneously injected into the combustion chambers until sufficient inner pressure in the pressure housing is attained to accomplish horizontal or vertical transport movement.

12. A method according claim 11, wherein combustion gases collected in said pressure housing are used to control movement in three coordinate axes.

13. A method according claim 11, further comprising closing and opening laterally arranged hatches in the pressure housing to control the direction of movement of the transport vehicle in horizontal direction, so that gases exiting from an open hatch produce an oppositely acting propulsion direction.

14. A method according to claim 11, further comprising opening and closing slides on the bottom of the pressure housing to control the vertical movement of the transport vehicle, wherein gases exiting from the slide cause an oppositely directed lift force.

* * * * *